Jan. 1, 1957     F. R. McDERMOTT     2,776,101
METHOD OF AND MEANS FOR MOUNTING A MACHINE
ON A VIBRATION ABSORBING PAD
Filed Aug. 10, 1955
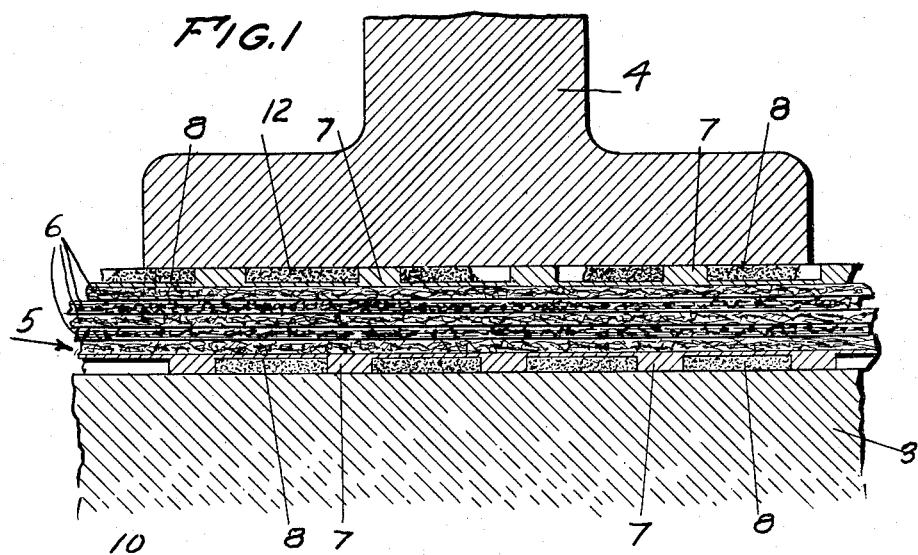
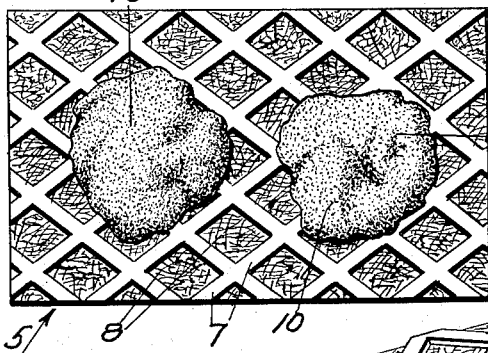
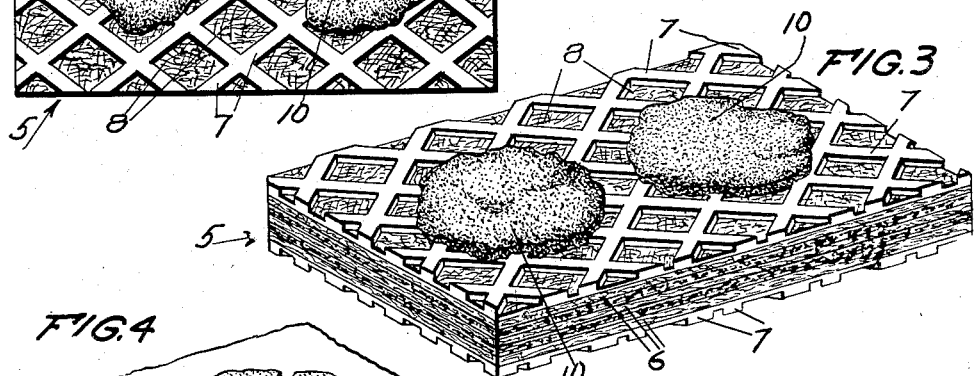
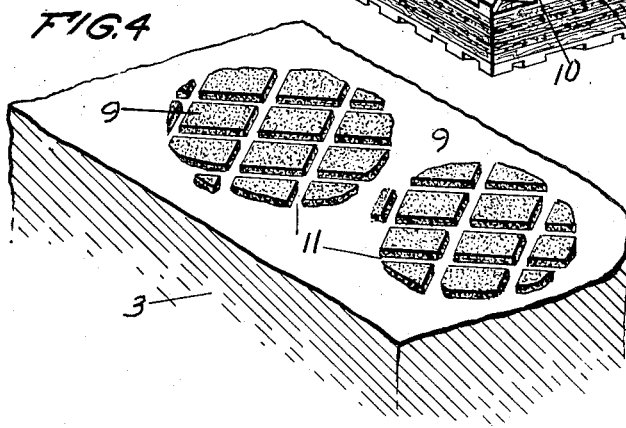
INVENTOR
FRANCIS ROLAND McDERMOTT
BY Louis C. Smith
ATTORNEY

United States Patent Office 2,776,101
Patented Jan. 1, 1957

2,776,101

METHOD OF AND MEANS FOR MOUNTING A MACHINE ON A VIBRATION ABSORBING PAD

Francis Roland McDermott, Franklin, Mass.

Application August 10, 1955, Serial No. 527,588

4 Claims. (Cl. 248—24)

It is a more or less common practice to place vibration absorbing pads between the floor on which is supported a machine that develops vibrations when it is used and the legs or supporting pedestals of such machine, the purpose of the pad being to absorb the vibrations generated in the machine and thus prevent them from being transmitted to the floor.

Unless the vibration absorbing pad is properly anchored to the floor, there exists the possibility that the vibrations absorbed by the pad may cause it to creep on the floor which, of course, is undesirable. To prevent creeping anti-vibration pads are sometimes nailed or otherwise permanently attached to the floor.

It is one object of the present invention to provide a novel manner of anchoring the vibration absorbing pad to the floor so as to prevent it from creeping without, however, permanently attaching the pad to the floor. An advantage of this is that it simplifies the mounting of the machine on the vibration absorbing pads and also simplifies the operation of changing the position or location of the machine, because when the machine has been lifted off the pad it can be picked up from the floor and placed in a new position without the necessity of having to disrupt a permanent attachment between the pad and the floor.

In the drawings wherein I have illustrated a selected embodiment of the invention, Fig. 1 is a fragmentary sectional view showing a portion of a supporting floor and one leg or foot of a machine supported on the floor, and also showing a vibration absorbing pad between the floor and the machine leg, which pad is anchored to both the floor and the machine leg in accordance with the present invention;

Fig. 2 is a plan view of a vibration absorbing pad having a small mass of anchoring material applied to its upper face;

Fig. 3 is a perspective view of the pad shown in Fig. 2 with the mass of anchoring material located on its upper face;

Fig. 4 is a fragmentary perspective view of a portion of the floor showing the anchoring material which is attached to the floor and which cooperates with the pad to prevent the latter from creeping.

In the drawings, 3 indicates a portion of the supporting floor of a building on which a machine is supported, only the leg or pedestal portion 4 of which is illustrated. 5 indicates a vibration absorbing pad which is placed between the floor 3 and the machine leg 4 for the purpose of absorbing any vibrations which may develop in the machine when it is being used.

The vibration absorbing pad herein illustrated is similar to that shown in my co-pending application, Serial No. 482,442 filed January 18, 1955, and it comprises a plurality of laminations 6 of needled fabric, the fibres of which are preferably sisal fibres, which laminations are bonded together by means of a vinyl plastic binder with which the laminations are impregnated. The pad also has a vinyl plastic coating on the top and bottom faces, and which coating presents a plurality of crossing ribs 7 which are composed to a large extent of the vinyl plastic composition, such ribs forming between them a plurality of depressed areas or indentations 8 of substantial size. The vinyl plastic composition gives the pad a smooth impervious surface free from small or minute surface indentations or pits. The pad 5 is anchored to the floor 3 by means of an anchoring material which is adhesively united to the floor but which will not adhere to the vinyl plastic composition forming the surface of the pad, said anchoring material having raised portions 9 which fill some of the indentations 8 on the under-face of the pad.

The pad is also held in position underneath the leg 4 of the machine by means of anchoring material which is adhesively united to the bottom face of the leg 4 and which presents raised portions 12 that fill the indentations 8 on the top face of the pad, the anchoring material used on the leg 4 being of a character such that it will adhere to the leg, but will not adhere to the vinyl plastic composition.

One way of proceeding with the matter of mounting the leg of the machine on the vibration absorbing pad in accordance with this invention is to apply a mass of anchoring material 10 such as above described and which is in moldable or semi-liquid state, to the place on the floor where the pad is to be located and then to place the pad on such anchoring material. If pressure is applied to the pad, the ribs 7 on the under-face thereof will be forced into the mass of anchoring material 10, thus causing said mass of material to conform to the shape and contour of the under-face of the pad. This will result in forcing some of the anchoring material into the indentations 8 on the under-face of the pad so that the mass of anchoring material will then present raised portions 9, as shown in Fig. 4, which are the portions of the anchoring material that have flowed into the indentations 8, and grooves or spaces 11 formed by the ribs 7. The anchoring material is of such a nature that it adheres to wood, or iron or concrete and thus will adhere to the floor 3, but it has the characteristic that it will not adhere to the vinyl plastic composition and so will not adhere to the pad 5. The anchoring material is self-hardening and after a short interval it sets or hardens, and then presents solid non-yieldable raised portions 9 which are rigidly attached to the floor and which fill some of the indentations 8 in the bottom surface of the pad.

After the pad has thus been placed on the floor, then one or more masses of the anchoring material will be deposited on top of the pad and the machine leg will then be placed on the pad. The weight of the machine causes the anchoring material 10 which has been deposited on the pad to conform to the contour of the upper surface of the pad, and because of its characteristic said anchoring material becomes permanently attached to the bottom of the leg 4 of the machine. As stated above, the anchoring material is of such a nature that it will not adhere to the vinyl plastic covering the top surface of the pad 5.

When the machine has been thus installed, it has rigid therewith on the under-face of the leg the raised portions 12 of the anchoring material which fill some of the indentations 8 in the top surface of the pad 5. The floor 3 also has rigidly secured to it raised portions 9 of the anchoring material which fill some of the indentations 8 on the under-face of the pad. The anchoring material, however, does not adhere to the vinyl plastic surfaces of the pad.

A vibration absorbing pad thus installed is prevented from creeping by the interlocking of the raised portions 9 of the anchoring material that are rigid with the floor 3 and the indentations 8 on the under side of the pad and also by the interlocking relation between the raised surfaces 12 of anchoring material that are rigid with the leg 4 of the machine and the indentations 8 in the top face of the pad.

The pad will thus be prevented from any creeping action, regardless of the character of the vibrations which it absorbs from the machine. Moreover, since the anchoring material does not adhere to the vinyl composition forming the top and bottom surfaces of the pad, the machine can be easily moved by simply lifting it off from the pad, and the pad may then be removed by simply lifting it off from the floor.

While any suitable anchoring material having the characteristics above mentioned may be used, I have found that the so-called liquid soldering material such as those known to the trade as "Smooth-on" and "Lab Metal" are eminently suitable for this purpose. These materials are in the nature of metallic powder mixed with a relatively small amount of binder and a sufficient amount of a highly volatile solvent to produce an easily moldable mass, which, when exposed to the air, will quickly harden or set due to the rapid evaporation of the solvent.

Wood, cement, iron and similar materials have minute surface irregularities that offer adhesive union with the fine metallic particles of the anchoring material when the solvent evaporates, but the vinyl composition used in making the pad hardens or sets with a smooth impervious surface which is free from any surface irregularities and which offers no means of adhesion with the liquid solder.

I claim:

1. Mounting means for a machine comprising a vibration absorbing pad on which the machine rests and which has a vinyl plastic coating and also indentations or depressed areas of substantial size in its bottom surface, and anchoring material in solid form which has no adhesive affinity for the vinyl plastic coating but which is adhesively united to a supporting floor and which fills some of the indentations or depressed areas in the under surface of the pad, the interlocking relation between the anchoring material and the depressed areas in the bottom surface of the pad consituting the sole means for anchoring the pad to the floor and holding it from movement relative thereto, said pad being free from any adhesive union with the anchoring material whereby the pad is free to be removed from the anchoring material when it is not supporting a machine.

2. Mounting means for a machine supported on a floor, said mounting means comprising a vibration absorbing pad on which the machine rests and which has a vinyl plastic coating on both top and bottom faces, and also has indentations or depressed areas of substantial size in both its top and bottom surfaces, anchoring material in solid form which has no adhesive affinity for the vinyl plastic coating but which is adhesively united to the floor and fills some of the depressed areas in the under face of the pad, and other similar anchoring material in solid form adhesively united to the machine and filling some of the indentations or depressed areas in the top surface of the pad, the interlocking relation between the anchoring material which fills the indentations or depressed areas in both the top and bottom faces of the pad and said indentations or depressed areas constituting the sole means for holding the pad from movement relative to both the floor and the machine, said pad being free from any adhesive union with the anchoring material, whereby the machine is free to be raised from the pad and when the machine is thus separated from the pad the latter is free to be removed from the anchoring material adhesively united to the floor.

3. A method of installing on a supporting floor a vibration absorbing pad on which a machine is to be mounted, which method consists in applying to the floor an anchoring material in easily moldable condition, which anchoring material has the characteristic that it will solidify rapidly when exposed to the air and when solidified will be adhesively and firmly attached to the floor, placing on said anchoring material while it is in an easily moldable condition and before it solidifies a vibration absorbing pad having an under surface of a character to which the anchoring material will not adhere and which is provided with depressed areas of substantial size, and while the anchoring material is still in its easily moldable condition applying to the pad sufficient downward pressure to cause said anchoring material to be molded to the contour of the under surface of the pad, whereby the anchoring material is forced into and fills one or more of the indentations in the under face of the pad, and maintaining such pressure until the anchoring material has solidified and has become adhesively attached to the floor, whereby the interlocking engagement between the depressed areas or indentations in the lower face of the pad and the solidified anchoring material which fills such depressed areas will effectively retain the pad in position in the absence of any adhesive union between the pad and the anchoring material.

4. The method of installing a vibration absorbing pad having depressed areas of substantial size in both its top and bottom surfaces between a supporting floor and the leg of a machine supported on the floor, which method consists in placing on the floor a quantity of anchoring material which is in easily moldable condition and which has the characteristic that it solidifies rapidly when exposed to air and the solidified material has the capacity for adhering firmly to the floor, placing on the anchoring material while it is in moldable condition a vibration absorbing pad having depressed areas of substantial size in both its top and bottom surfaces, which surfaces are composed of material that will not adhere to the anchoring material, placing a quantity of said anchoring material while in readily moldable condition on top of the pad, molding the anchoring material on both the top and bottom faces of the pad to the contour of such faces by placing the machine on the anchoring material on the top of the pad, whereby the weight of the machine causes the anchoring material to flow into and fill some of the depressed areas in both top and bottom surfaces of the pad, and maintaining the weight of the machine on the anchoring material and pad until the anchoring material becomes solidified, the interlocking relation between the depressed areas in the top and bottom faces of the pad and the solidified anchoring material which fills the said depressed areas constituting the sole means for preventing any creeping movement between the pad and either the floor or the machine.

References Cited in the file of this patent
UNITED STATES PATENTS 1,077,200    Maurer _____ Oct. 28, 1913